United States Patent
Yamauchi et al.

(10) Patent No.: US 6,949,231 B2
(45) Date of Patent: Sep. 27, 2005

(54) PCB DECOMPOSITION REACTOR

(75) Inventors: Yasuhiro Yamauchi, Nagasaki (JP); Kan Ogata, Nagasaki (JP); Takashi Moribe, Nagasaki (JP); Masakazu Tateishi, Nagasaki (JP); Tadatsugu Fukuzumi, Nagasaki (JP); Mitsuji Iwao, Nagasaki (JP); Nobuyuki Ikeda, Nagasaki (JP); Naoki Shindo, Nagasaki (JP); Nobuhiro Hokao, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 517 days.

(21) Appl. No.: 09/975,614

(22) Filed: Oct. 10, 2001

(65) Prior Publication Data

US 2002/0034459 A1 Mar. 21, 2002

Related U.S. Application Data

(63) Continuation of application No. 09/266,388, filed on Mar. 11, 1999, now Pat. No. 6,322,761.

(30) Foreign Application Priority Data

Mar. 13, 1998 (JP) .................................... 1998/062642

(51) Int. Cl.[7] ................................................ B01J 8/00
(52) U.S. Cl. .................. 422/234; 422/139; 422/140; 422/145; 422/147; 422/231; 422/232; 588/207
(58) Field of Search ................................ 422/232, 139, 422/140, 147, 224, 231, 234, 145; 588/207

(56) References Cited

U.S. PATENT DOCUMENTS

| 4,351,978 | A | * | 9/1982 | Hatano et al. | ............... 588/207 |
| 4,612,404 | A | * | 9/1986 | Thyagarajan | ................ 588/207 |
| 4,931,260 | A | * | 6/1990 | Molerus et al. | ............. 422/147 |
| 5,746,926 | A | * | 5/1998 | Ross et al. | ................... 210/761 |
| 6,124,519 | A | * | 9/2000 | Sako et al. | ................. 588/205 |
| 6,235,963 | B1 | * | 5/2001 | Yamauchi et al. | .......... 588/205 |
| 6,322,761 | B1 | * | 11/2001 | Yamauchi et al. | .......... 422/234 |

* cited by examiner

Primary Examiner—Kevin P. Kerns
(74) Attorney, Agent, or Firm—Myers Bigel Sibley & Sajovec PA

(57) ABSTRACT

A PCB decomposition reactor includes: an injector for injecting a mixture of water and sodium hydroxide connected to the lower part of the reaction vessel; an outlet pipe for withdrawing treated fluid connected to the sidewall of the reaction vessel and a cyclone for separating sodium carbonate from the treated fluid; a discharge pipe connected to the top of the cyclone to discharge treated fluid from which precipitated sodium carbonate has been removed; a downcomer for the separated fluid connected to the bottom of the cyclone so that precipitated sodium carbonate and fluid containing it are discharged therethrough and to an injector which is connected to a feed pipe for feeding a mixture of PCB and mineral oil; and a gas supply nozzle for injecting a gas into the reaction vessel installed at the bottom of the reaction vessel.

3 Claims, 3 Drawing Sheets

PCB DECOMPOSITION REACTOR

Continuation of application Ser. No. 09/266,388, filed on Mar. 11, 1999, now U.S. Pat. No. 6,322,761.

BACKGROUND OF THE INVENTION AND RELATED ART STATEMENT

1. Field of the Invention

This invention relates to a reactor for use in a system for decomposing organic oil or fat containing PCB (polychlorobiphenyl) and thereby making it nonpoisonous. More particularly, it relates to a PCB decomposition reactor for mixing PCB with water, an oxidizing agent and sodium hydroxide and effecting its thermal decomposition at high temperature and under elevated pressure.

2. Description of Related Art

FIG. 3 illustrates an example of a conventional reactor for use in PCB decomposition system. In this reactor, a feed pipe 23 for feeding a mixture 22 of water, PCB, mineral oil and sodium carbonate to a hollow reaction vessel 21 is connected to the lower part of its side wall. Moreover, reaction vessel 21 is equipped with pipes 24 and 25 which connect the upper part of its sidewall and feed pipe 23 in flow communication relationship, and a circulating pump 26 for agitating purposes is installed between pipes 24 and 25.

An outlet pipe 28 for supplying the reaction fluid to a cyclone separator 27 is provided at the top of reaction vessel 21. The top of cyclone separator 27 is equipped with a discharge pipe 29, which is connected to the equipment constituting the downstream side of the PCB decomposition system. The bottom of cyclone separator 27 is equipped with a recirculation pipe 30, the other end of which is connected to reaction vessel 21. Moreover, a gas supply nozzle 32 for supplying air or oxygen 31 is connected to the bottom of reaction vessel 21.

When the PCB decomposition reactor having the above-described construction is operated, reaction vessel 21 is supplied with water at 250 kgf/cm$^2$ and 380° C., and also with PCB, mineral oil and sodium carbonate. Circulating pump 26 serves to agitate the reaction fluid within reaction vessel 21, and also introduce the reactant mixture 22 of water, PCB, mineral oil and sodium carbonate having a temperature of 200 to 250° C. from the outside into reaction vessel 21 by mixing it with the steam of the fluid driven by circulating pump 26. This mixture 22 undergoes an exothermic reaction within reaction vessel 21 and causes sodium carbonate to precipitate.

At the bottom of reaction vessel 21, air or oxygen 31 is injected from gas supply nozzle 32. This air or oxygen 31 serving as an oxidizing agent dissolves in the reaction fluid while it goes up through reaction vessel 21 in the form of gas bubbles, thus causing an agitation flow within reaction vessel 21. The sodium carbonate precipitated within reaction vessel 21 is agitated into contact with PCB by the circulation flow caused by circulating pump 26 and the stream of gas bubbles injected from gas supply nozzle 32, so that the decomposition reaction of PCB is accelerated.

As described above, the conventional reaction vessel 21 has used sodium carbonate in order to decompose PCB. The solubility of sodium carbonate decreases with rising temperature, and it scarcely dissolves at temperatures above 350° C. Consequently, it has been conventional practice to feed the mixture 22 of water, PCB, mineral oil and sodium carbonate having a temperature of 250° C. to reaction vessel 21 having a temperature of 380° C. and thereby precipitate the sodium carbonate within reaction vessel 21 in the form of solid particles. The precipitated sodium carbonate, together with the introduced fluid, is agitated by gas bubbles of oxygen. Thus, a so-called three-phase fluidized bed consisting of a solid, a gas and a liquid is formed to accelerate the decomposition reaction of PCB.

OBJECT AND SUMMARY OF THE INVENTION

The reactor having the above-described construction has the following problems.

A circulating pump which can be used under high-pressure temperature and high-pressure conditions (e.g., at 380° C. and 250 kgf/cm$^2$) is expensive and hence raises the overall equipment cost. Since the combustion rate of oil in a liquid is high, the reactant mixture fed through the feed pipe reacts with oxygen dissolved in water and causes heat evolution in the feed pipe. If sodium carbonate alone is supplied, the sodium carbonate produced by the oxidation reaction is converted into sodium bicarbonate, resulting in a reduction in the rate of the decomposition reaction of PCB. If sodium carbonate is introduced into the reaction fluid, the solubility of oxygen is reduced and a gas phase is produced at the top of the reaction vessel. This causes a mixed gas-liquid phase to flow into the cyclone separator, resulting in a reduction in the separation efficiency of the cyclone separator.

The present invention has been made in view of the above-described problems, and an object thereof is to provide a PCB decomposition reactor which does not involve unduly high equipment cost and which can decompose PCB efficiently.

In order to accomplish the above object, the present invention provides a PCB decomposition reactor comprising a reaction vessel for decomposing PCB therein and a cyclone separator disposed in flow communication with an outlet of the reaction vessel for separating sodium carbonate particles from the reaction fluid withdrawn through the outlet, wherein the outlet is formed in the sidewall of the reaction vessel.

Moreover, in order to accomplish the above object, the present invention also provides a PCB decomposition reactor comprising a reaction vessel for decomposing PCB therein and a cyclone separator disposed in flow communication with an outlet of the reaction vessel for separating sodium carbonate particles from the reaction fluid withdrawn through from the outlet, wherein the reaction vessel is equipped with an injector for injecting water and sodium hydroxide from the outside to the inside of the reaction vessel, and a pipe for introducing the sodium carbonate particles separated by the cyclone separator into the suction chamber of the injector.

Furthermore, in order to accomplish the above object, the present invention also provides a PCB decomposition reactor comprising a reaction vessel for decomposing PCB therein and a feed pipe for feeding PCB and a solvent therefor to the reaction vessel, wherein an injector for injecting water and sodium hydroxide from the outside to the inside of the reaction vessel is connected to the reaction vessel, and the feed pipe is connected to the flow path between the connected end of the injector and the suction port of the injector for supplying water and sodium hydroxide therethrough.

Additionally, in order to accomplish the above object, the present invention also provides a PCB decomposition reactor comprising a reaction vessel for decomposing PCB therein with the aid of sodium carbonate, wherein the molar amount of sodium hydroxide supplied to the reaction vessel in order to form sodium carbonate is controlled so as to fall within a range which does not cause any excess sodium carbonate to precipitate.

Specifically, in the PCB decomposition reactor of the present invention, sodium hydroxide and sodium bicarbonate are dissolved in water, and this solution is mixed with PCB, mineral oil serving as a solvent therefor, and sodium carbonate particles formed as the reaction product. To the resulting mixture, oxygen is supplied from a gas supply nozzle. The resulting reaction fluid is fed to a cyclone separator through an outlet pipe connected to the reaction vessel at a position below the top thereof, so that the precipitated sodium carbonate particles are separated. The reaction fluid from which sodium carbonate has been removed is discharged to the downstream side of the cyclone separator through a discharge pipe. The separated sodium carbonate particles are supplied to the flow path of an injector through a downcomer for the fluid separated by the cyclone separator. A mixture of water and sodium hydroxide is supplied to the injector as a driving fluid. Moreover, a mixture of PCB and mineral oil is fed to the flow path of the injector.

DETAILED DESCRIPTION OF PREFERRED EMBODIMENTS

The construction of a PCB decomposition reactor in accordance with the present invention is described below with reference to the accompanying drawings.

Conventionally, several processes for the decomposition of PCB have been proposed. The present invention is directed to the decomposition of PCB with the aid of sodium hydroxide and an oxidizing agent (i.e., air and/or oxygen).

PCB to be decomposed has the following structure.

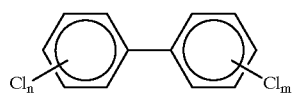

(1)

When the average number of chlorine atoms is 4, the decomposition reaction is represented by the following reaction formula.

$$C_{12}H_6Cl_4 + 12.5O_2 + 2Na_2CO_3 \rightarrow 4NaCl + 3H_2O + 14CO_2 \quad (2)$$

Figure 2:
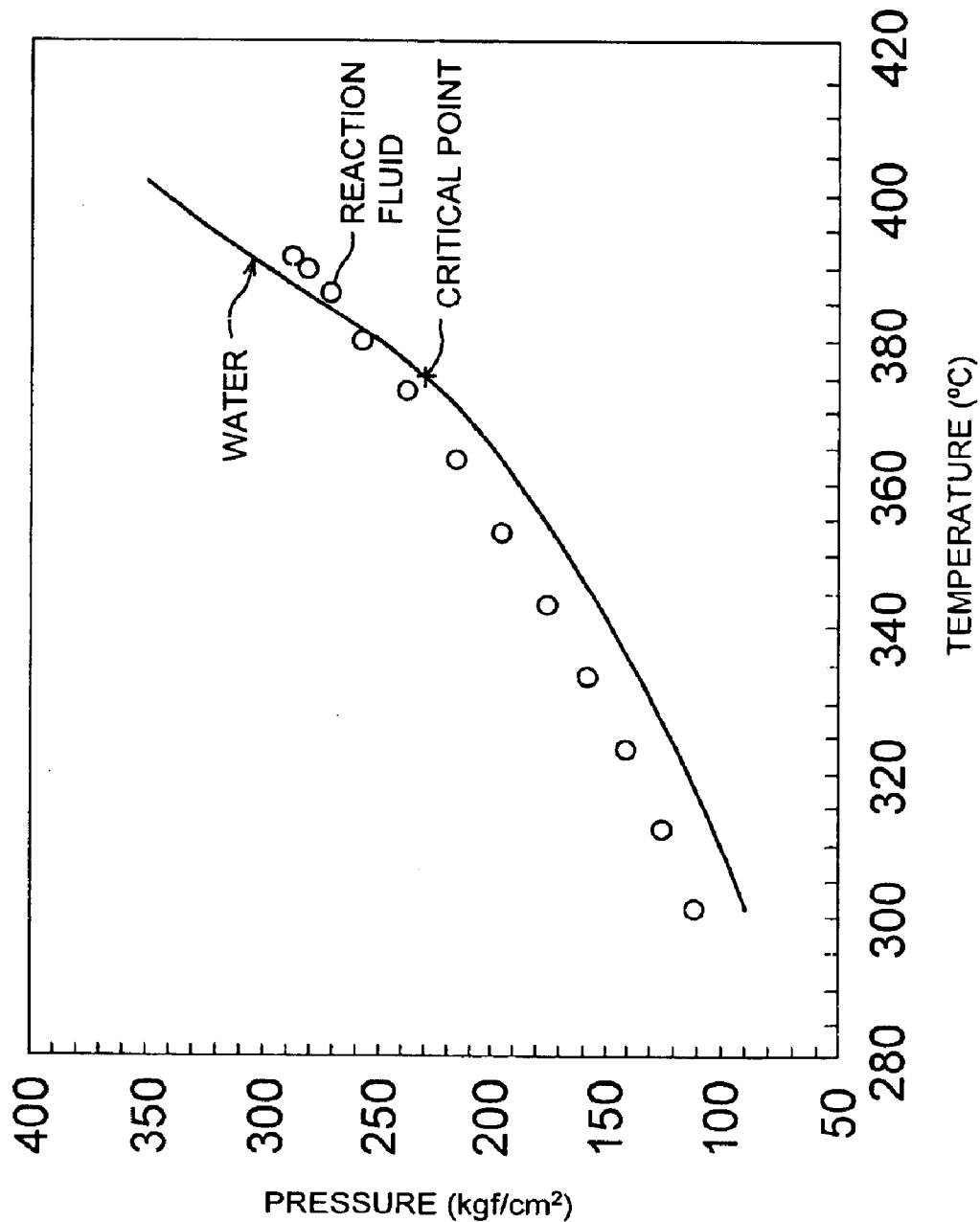
FIG. 2 is a graph showing the relationship between the pressure and temperature of the reaction fluid in a vessel having a fixed volume.
Figure 3:
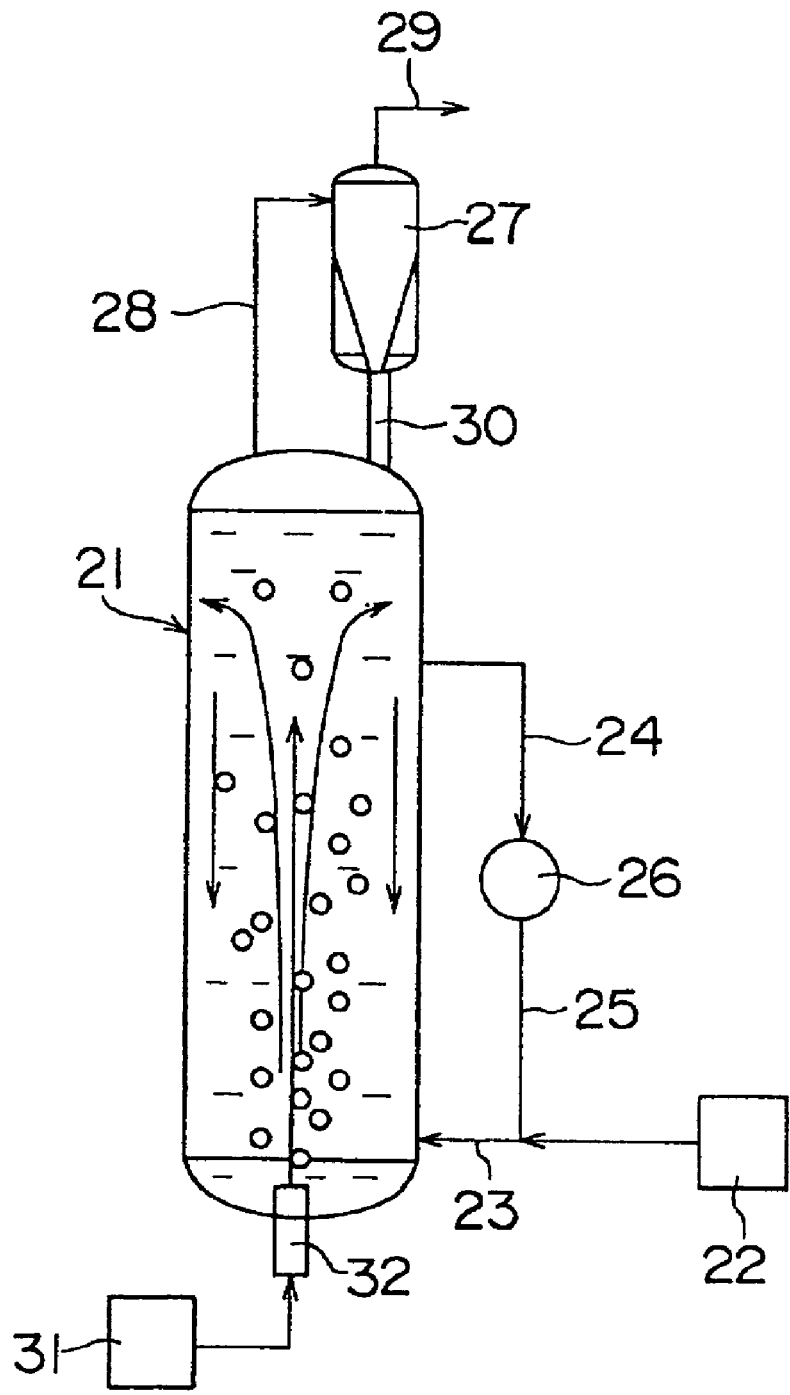
FIG. 3 is a longitudinal sectional view of a conventional PCB decomposition reactor.

If an electrolytically dissociating solute such as sodium carbonate is dissolved in water, a rise in critical point is observed. When a fluid in which the above-described reaction is occurring is placed in a vessel having a fixed volume, the relationship between the pressure and temperature thereof is shown in FIG. 2. In the case of water, the rate of increase in pressure with rising temperature is augmented at a critical point characterized by 225.56 kgf/cm² and 374.15° C. However, such an increase in pressure is not observed in the case of the aforesaid reaction fluid, suggesting that it remains in the form of pressurized water even beyond the critical point. Since PCB is decomposed at a temperature in the range of 370 to 400° C., the pressure required therefor is in the range of 225 to 310 kgf/cm². Moreover, the formed sodium carbonate has low solubility at temperatures above 370° C. and hence precipitates within the reaction vessel in the form of solid particles.

The carbon dioxide produced according to the above reaction formula (2) dissolves in water to form carbonic acid, which undergoes the following reversible reactions with excess sodium hydroxide.

$$14CO_2 + 14H_2O \longleftrightarrow 14H_2CO_3$$

$$14H_2CO_3 + 14NaOH \longleftrightarrow 14NaHCO_3 + 14H_2O \quad (3)$$

$$14NaHCO_3 + 14NaOH \longleftrightarrow 14Na_2CO_3$$

The amounts of sodium bicarbonate and sodium carbonate formed vary according to the amount of excess sodium hydroxide. The formed sodium carbonate is supplied as the sodium carbonate shown in the left side of the above reaction formula (2).

If sodium hydroxide is supplied in an amount of 28 moles per mole of PCB, sodium carbonate is produced within the reactor in 7 times the required molar amount. Alternatively, if sodium hydroxide is supplied in an amount of 4 moles per mole of PCB, sodium carbonate is produced in the equivalent amount required for the reaction.

Conventionally, sodium carbonate, either alone or with a small amount of sodium hydroxide, has been added for the purpose of decomposing PCB. However, as described above, PCB can also be decomposed to water, NaCl, sodium bicarbonate and sodium carbonate by use of sodium hydroxide and oxygen.

In view of the above reaction formulae, an apparatus as described below has been constructed.

Figure 1:
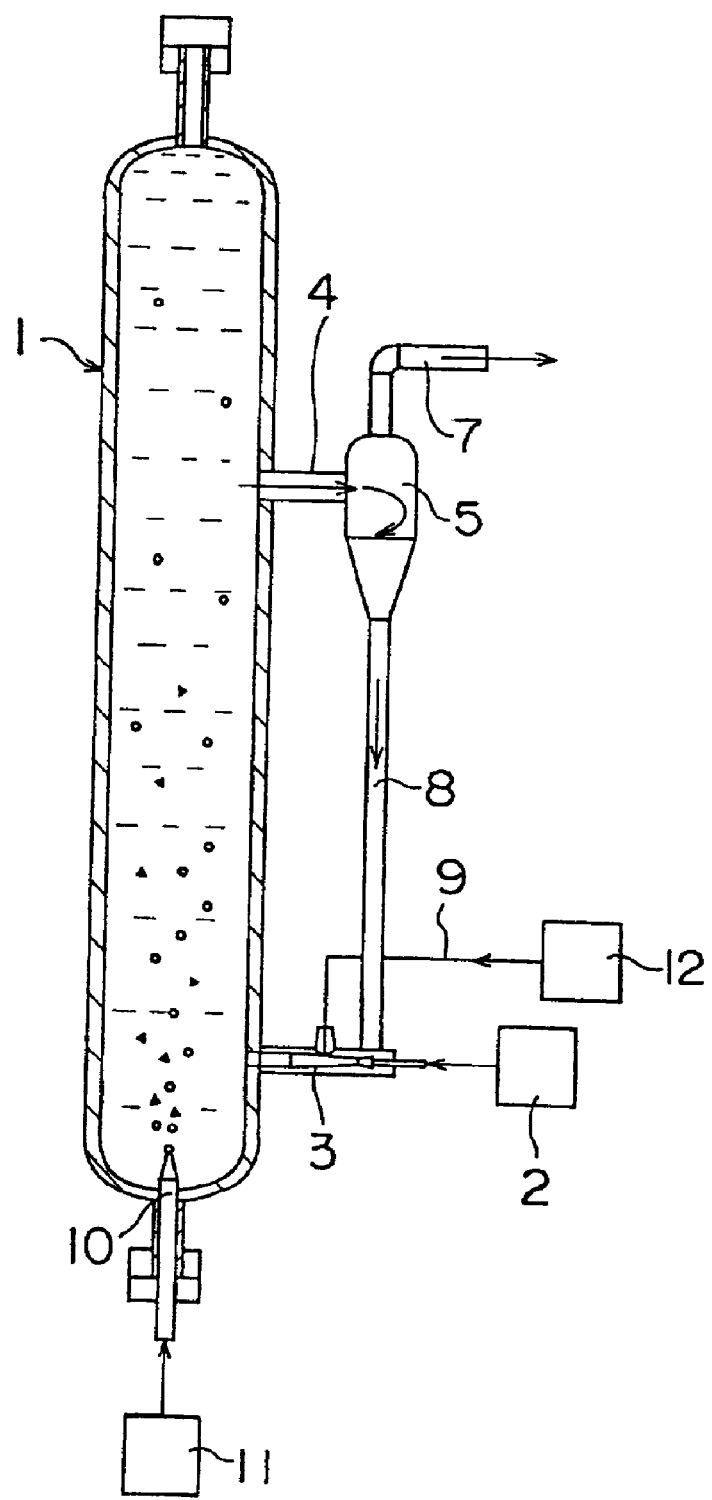
FIG. 1 is a longitudinal sectional view of a PCB decomposition reactor in accordance with one embodiment of the present invention.

FIG. 1 illustrates a PCB decomposition reactor for a PCB decomposition system in accordance with one embodiment of the present invention. In this PCB decomposition reactor, an injector 3 for injecting a mixture 2 of water and sodium hydroxide into a hollow reaction vessel 1 is connected to the lower part of its sidewall. Moreover, an outlet pipe 4 for withdrawing the fluid treated in reaction vessel 1 is connected to the upper part of its sidewall. The other end of outlet pipe 4 is connected to a cyclone separator 5. This cyclone separator 5 has a structure which permits sodium carbonate to be separated from the treated fluid withdrawn from reaction vessel 1.

A discharge pipe 7 is connected to the top of cyclone separator 5, so that the treated fluid from which the precipitated sodium carbonate has been removed is discharged therethrough. Moreover, a downcomer 8 for the separated fluid is connected to the bottom of cyclone separator 5, so that the precipitated sodium carbonate and some fluid containing it are discharged therethrough. The lower end of downcomer 8 is connected to the suction chamber of injector 3.

Injector 3 has an expanded section of increased diameter on the side connected to reaction vessel 1, and a feed pipe 9 for introducing a mixture 12 of PCB and mineral oil serving as a solvent therefor is connected thereto. At the bottom of reaction vessel 1, a gas supply nozzle 10 for injecting a gas into reaction vessel 1 is installed. This gas supply nozzle 10 is connected to a source of air or oxygen 11.

Now, the operation of the PCB decomposition reactor in accordance with this embodiment is described below.

The amount of oxygen supplied to reaction vessel 1 is controlled so that oxygen is supplied in the theoretical amount required to oxidize PCB and mineral oil and will hence be completely consumed in reaction vessel 1. However, since the amounts of the reactants cannot be perfectly controlled so as to become equal to their theoretical amounts, an amount of oxygen corresponding to its solubility in water dissolves in the fluid and any excess oxygen accumulates at the top of reaction vessel 1 so as to form a gas phase.

The amounts of water and the PCB-mineral oil mixture are controlled so that the desired reaction temperature, for example, of 380° C. (usually in the range of 350 to 400° C. and preferably 370 to 400° C.) is achieved owing to the heat evolved by the oxidation of the PCB and mineral oil fed to reaction vessel 1 and the heat released therefrom.

In reaction vessel 1, the water, sodium hydroxide, PCB and mineral oil fed from injector 3 react with air or oxygen 11 supplied from gas supply nozzle 10 to form sodium chloride, water, sodium carbonate and sodium bicarbonate. In this process, the proportion of sodium carbonate to sodium bicarbonate formed varies according to the amount of sodium hydroxide supplied.

In this embodiment, sodium hydroxide is supplied to reaction vessel 1 in an amount of 1 to 2 moles per mole of PCB so that the decomposition reaction of PCB may proceed and no excess sodium carbonate may precipitate within the reactor. In such a case, the pH is usually in the range of 7.5 to 13 and preferably 8 to 12.

At the temperature of 380° C., the sodium carbonate so formed precipitates in the form of active fine particles, which promote the dechlorination reaction of PCB. The sodium carbonate is agitated within reaction vessel 1 by the gas bubbles of air or oxygen 11 and the circulating fluid injected from injector 3, so that the reaction of PCB by contact with the sodium carbonate is accelerated.

In cyclone separator 5, sodium carbonate particles are separated from the reaction fluid withdrawn from reaction vessel 1. The separated sodium carbonate particles and some fluid are fed to injector 3 through downcomer 8 for the separated fluid and recirculated to reaction vessel 1. The amount of fluid recirculated by injector 3 is designed so as to be equal to 1–10 times the feed rate of the fluid.

Injector 3 is driven by the mixture 2 of water and sodium hydroxide. PCB and mineral oil are fed to the expanded section formed behind the throat of injector 3 and having a high flow velocity, so that the oil is mixed with the fluid by its shearing force and hence prevented from causing local heat evolution.

In this embodiment, the conventionally used circulating pump is replaced by injector 3 and the separated fluid from cyclone separator 5 is circulated to reaction vessel 1 by using the pressure of the mixture 2 of water and sodium hydroxide as the driving force. In this process, the mixture 12 of PCB and mineral oil is fed to the part of injector 3 which is close to the injection orifice thereof and has a high flow velocity, so that it is mixed with water having air or oxygen 11 dissolved therein and hence prevented from causing rapid heat evolution.

A proper amount (i.e., an excessive amount which is required for the reaction but does not cause sodium carbonate particles to accumulate within the reactor) of sodium carbonate particles can be precipitated within the reactor by controlling the feed rate of sodium hydroxide.

Outlet pipe 4 leading to cyclone separator 7 is attached to reaction vessel 1 at a position below the top thereof, so that undissolved oxygen accumulates at the top of reaction vessel 1. If oxygen is supplied in the theoretical amount required to oxidize PCB and mineral oil, the surface of the fluid is maintained at a level where the rate of dissolution of oxygen into the fluid through the gas-liquid interface is balanced by the rate of accumulation of oxygen.

While the present invention has been described above in connection with one specific embodiment, it is a matter of course that the present invention is not limited thereto but may be practiced in various other ways on the basis of its technical conception.

According to the present invention, the outlet of the reaction vessel which communicates with the cyclone separator is formed in the sidewall of the reaction vessel, so that the gas phase produced at the top of the reaction vessel is prevented from being transferred to the cyclone separator.

Moreover, the reaction vessel is equipped with an injector for injecting water and sodium hydroxide from the outside to the inside of the reaction vessel, and a pipe for introducing sodium carbonate particles separated by the cyclone separator into the suction chamber of the injector, the need for a circulating pump is eliminated. The introduction of sodium carbonate particles into the reaction vessel serves to activate the decomposition of PCB and also to agitate the reaction fluid within the reaction vessel.

Furthermore, a feed pipe for feeding PCB and a solvent therefor is connected to the flow path between the suction chamber and connected end of the injector for injecting water and sodium hydroxide, so that PCB can be agitated properly.

In addition, the amount of sodium hydroxide supplied to the reaction vessel in order to form sodium carbonate is controlled so as to fall within a range which does not cause any excess sodium carbonate to precipitate, so that the proper amount of sodium carbonate particles can be precipitated within the reaction vessel.

The entire disclosure of Japanese Patent Application No. 062642/1998 filed on Mar. 13, 1998 including specification, claims, drawings and summary are incorporated herein by reference in its entirety.

What is claimed is:

1. A PCB decomposition reactor comprising:
   (a) a reaction vessel for decomposing PCB therein;
   (b) a cyclone separator disposed in flow communication with an outlet of said reaction vessel for separating sodium carbonate particles from a reaction fluid withdrawn through said outlet, wherein said outlet is formed in a sidewall of said reaction vessel, said reaction vessel being equipped with an injector connected thereto for injecting water and sodium hydroxide from the outside to the inside of said reaction vessel, and a pipe connected to a suction chamber of said injector for introducing the sodium carbonate particles separated by said cyclone separator into the said suction chamber, said injector comprising a suction port; and
   (c) a feed pipe for feeding PCB and a solvent therefor to said reaction vessel, wherein said feed pipe is connected to a flow path between an end of said injector connected to said reaction vessel and the suction port of said injector for supplying water and sodium hydroxide therethrough such that the pH in the reaction vessel is from about pH 7.5 to about pH 13, wherein the sodium hydroxide is supplied to said reaction vessel in an amount of about 1 to about 2 moles per mole of PCB in order to form sodium carbonate so as to fall within a range which does not cause any excess sodium carbonate to precipitate, and wherein a nozzle for introducing air in order to agitate the reaction fluid within said reaction vessel is connected to the bottom of said reaction vessel.

2. A PCB decomposition reactor comprising:

(a) a reaction vessel for decomposing PCB therein; and (b) a cyclone separator disposed in flow communication with an outlet of said reaction vessel for separating sodium carbonate particles from a reaction fluid withdrawn through said outlet, wherein said outlet is formed in a sidewall of said reaction vessel, said reaction vessel being equipped with an injector connected thereto for injecting water and sodium hydroxide from the outside to the inside of said reaction vessel, and a pipe connected to a suction chamber of said injector for introducing the sodium carbonate particles separated by said cyclone separator into the said suction chamber, said injector comprising a suction port; and (c) a feed pipe for feeding PCB and a solvent therefor to said reaction vessel, wherein said feed pipe is connected to a flow path between an end of said injector connected to said reaction vessel and the suction port of said injector for supplying water and sodium hydroxide therethrough such that the pH in the reaction vessel is from about pH 7.5 to about pH 13, wherein the sodium hydroxide is supplied to said reaction vessel in an amount of about 1 to about 2 moles per mole of PCB in order to form sodium carbonate so as to fall within a range which does not cause any excess sodium carbonate to precipitate, and wherein a nozzle for introducing oxygen in order to agitate the reaction fluid within said reaction vessel is connected to the bottom of said reaction vessel.

3. A PCB decomposition reactor comprising:

(a) a reaction vessel for decomposing PCB therein;

(b) a cyclone separator disposed in flow communication with an outlet of said reaction vessel for separating sodium carbonate particles from a reaction fluid withdrawn through said outlet, wherein said outlet is formed in a sidewall of said reaction vessel, said reaction vessel being equipped with an injector connected thereto for injecting water and sodium hydroxide from the outside to the inside of said reaction vessel, and a pipe connected to a suction chamber of said injector for introducing the sodium carbonate particles separated by said cyclone separator into the said suction chamber, said injector comprising a suction port; and (c) a feed pipe for feeding PCB and a solvent therefor to said reaction vessel, wherein said feed pipe is connected to a flow path between an end of said injector connected to said reaction vessel and the suction port of said injector for supplying water and sodium hydroxide therethrough such that the pH in the reaction vessel is from about pH 7.5 to about pH 13, wherein the sodium hydroxide is supplied to said reaction vessel in an amount of about 1 to about 2 moles per mole of PCB in order to form sodium carbonate so as to fall within a range which does not cause any excess sodium carbonate to precipitate, and wherein a nozzle for introducing air and oxygen in order to agitate the reaction fluid within said reaction vessel is connected to the bottom of said reaction vessel.

* * * * *